(12) United States Patent
Song et al.

(10) Patent No.: US 9,131,252 B2
(45) Date of Patent: Sep. 8, 2015

(54) TRANSMISSION OF 3D MODELS

(75) Inventors: Jian Ping Song, Beijing (CN); Lin Du, Beijing (CN); Guang Hua Zhou, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 819 days.

(21) Appl. No.: 13/135,908

(22) Filed: Jul. 18, 2011

(65) Prior Publication Data
US 2012/0019621 A1   Jan. 26, 2012

(30) Foreign Application Priority Data
Jul. 22, 2010   (WO) ................ PCT/CN2010/001106

(51) Int. Cl.
*H04N 21/236* (2011.01)
*H04N 21/81* (2011.01)

(52) U.S. Cl.
CPC ........... *H04N 21/236* (2013.01); *H04N 21/816* (2013.01); *H04N 21/8146* (2013.01)

(58) Field of Classification Search
CPC .......... H04N 13/0239; H04N 13/0055; H04N 13/0296
See application file for complete search history.

(56) References Cited

U.S. PATENT DOCUMENTS

| | | | |
|---|---|---|---|
| 5,619,629 A | 4/1997 | Yutaka | |
| 5,963,209 A | 10/1999 | Hoppe | |
| 6,362,818 B1 | 3/2002 | Gardiner et al. | |
| 6,480,205 B1 | 11/2002 | Greene et al. | |
| 6,600,487 B1 | 7/2003 | Henn et al. | |
| 6,839,058 B1 | 1/2005 | Ashton | |
| 2004/0179007 A1* | 9/2004 | Bower et al. | 345/419 |
| 2011/0191716 A1* | 8/2011 | Sakamoto et al. | 715/810 |

OTHER PUBLICATIONS

Kim et al., View-dependent Transmission of Three-dimensional Mesh Models Using Hierarchical Partitioning, Visual Communication and Image Processing 2003 Proceedings of SPIE vol. 5150, Jun. 16, 2003.
Yang et al., A Progessive View Dependent Technique for Interactive 3-D Mesh Transmission, IEEE Transactions on Circuits and Systems for Video Technology, vol. 14, No. 11, Nov. 1, 2004.

* cited by examiner

*Primary Examiner* — Dave Czekaj
*Assistant Examiner* — Nam Pham
(74) *Attorney, Agent, or Firm* — Robert D. Shedd; Paul P. Kiel; Xiaoan Lu

(57) ABSTRACT

A method and an apparatus for transmitting a 3D model associated to stereoscopic content are described, and more specifically a method and an apparatus for the progressive transmission of 3D models. Also described are a method and an apparatus for preparing a 3D model associated to a 3D video frame for transmission and a non-transient recording medium comprising such a prepared 3D model. The 3D model is split into one or more components. It is then determined whether a component of the one or more components is hidden by other 3D content. For transmission those components of the 3D model that are not hidden by other 3D content are transmitted first. The remaining components of the 3D model are transmitted subsequently.

11 Claims, 4 Drawing Sheets

TRANSMISSION OF 3D MODELS

This application claims the benefit, under 35 U.S.C. §119 of PCT Patent Application PCT/CN2010/001106, filed Jul. 22, 2010.

FIELD OF THE INVENTION

The present invention relates to a method and an apparatus for transmitting a 3D model associated to stereoscopic content, and more specifically to a method and an apparatus for the progressive transmission of 3D models. The invention further relates to a method and an apparatus for preparing a 3D model associated to a 3D video frame for transmission, and to a recording medium including such a prepared 3D model.

BACKGROUND OF THE INVENTION 3D models are typically comprised of a set of connected points in 3D space, commonly referred to as vertices. The points are connected in such a way that a polygonal mesh structure is formed. In the most general case, the polygons may have any number of sides. In the following it is assumed that the polygons are all triangles. However, as any planar polygon can be divided into a set of triangles, the described graphics process does not suffer any loss of generality.

The introduction of 3D visualization is expected to be the next technological differentiator in consumer-oriented video devices. In the past few years, the complete chain, from the content generation to the viewing experience, has become increasingly mature. Many standard organizations have launched study groups on the transmission of 3D content. More and more 3D distributed applications increase the demand for efficient transmission of 3D models. Some distributed virtual reality (VR) applications even demand real-time on-request transmission of 3D models. Generally a standard client-server architecture is employed, in which a central server maintains a geometry database of the virtual environment and distributes object models to clients upon request. Because these 3D models may be complex and are usually large in number, the network bandwidth often becomes the bottleneck of such a system.

Currently there are mainly two approaches to encode the 3D models to reduce the amount of information that has to be sent through the network. The first approach is to apply a geometry-compression method to reduce the storage size of the models. Most geometry-compression methods consider the geometry information shared by neighboring polygons and reduce the amount of data needed to represent the polygon mesh.

The second approach is to encode the 3D models for progressive transmission. For this approach the models are converted in such a way that partially transmitted models can be rendered and progressively refined as more information is received. As a result, the client no longer needs to wait for the whole model to be transmitted before rendering, and it can thus provide a more immediate visual feedback to the user.

For the latter approach, the 3D model is decomposed into a base mesh and a sequence of progressive records. The base mesh represents the minimum-resolution model of the 3D object. A progressive record stores information of a vertex split that may slightly increase the resolution of the base mesh by introducing two triangles into it. Hence, by applying the sequence of progressive records to the base mesh, the model will gradually increase in resolution until it reaches the highest resolution when all the records have been applied. The resolution of the model can be decreased by reversing the above operation.

A few progressive methods have been developed in the past years. However, all these methods are based on the principle that the partially transmitted model should look like the original complete model with a subsequently increasing resolution. Therefore, initially the viewers are always confronted with a low resolution model.

More and more 3D distributed applications increase the demand for efficient transmission of 3D models. For example, in a 3D TV transmission network such as MPEG TS (MPEG Transport Stream), DVB (Digital Video Broadcasting) and CMMB (China Multimedia Mobile Broadcasting), many 3D programs are transmitted concurrently. 3D models need to be transmitted and rendered along with relevant 3D videos. Usually a 3D model has to be received completely before it can be rendered by a client. As these 3D models may be complex and are usually large in number, the network bandwidth often becomes the bottleneck of the transmission system.

SUMMARY OF THE INVENTION

It is an object of the invention to propose a method and a system for transmitting 3D models, which allow to operate with reduced requirements for the network bandwidth.

According to the invention, this object is achieved by a method for transmitting a 3D model associated to a 3D video frame, having the steps of:
  splitting the 3D model into one or more components;
  determining whether a component of the one or more components is hidden by other 3D content;
  transmitting those components of the 3D model that are not hidden by other 3D content; and
  subsequently transmitting the remaining components of the 3D model.

Similarly, a method for preparing a 3D model associated to a 3D video frame for transmission has the steps of:
  splitting the 3D model into one or more components; and
  determining whether a component of the one or more components is hidden by other 3D content.

Before transmission the 3D models that are going to be transmitted are split into different components. When the server device begins to transmit the 3D models, the components that are not hidden by other 3D content, e.g. 3D video, other components of the 3D model, other 3D models, and so on, are transmitted first. As a result, it is possible that only a part of a 3D model has been transmitted when the client tries to render the 3D model. However, since those components that are not transmitted are hidden by the content of 3D video or other 3D models, the viewer will not notice that the 3D model is incomplete. As the transmission progresses, the remaining components of the 3D models are transmitted to the client by the server device. Therefore, the client will finally receive complete 3D models. The proposed solution has the advantage that only a reduced bandwidth is necessary to transmit the 3D models, while at any time the viewer experiences a highest resolution of the models.

Preferably, a list of components of the 3D model is generated, in which the components of the 3D model are ordered in accordance with their depth. This allows to easily determine at least which components are hidden by other components of the 3D model. By generating a single list of components for all 3D models associated to the 3D video frame, in which the components of all 3D models are ordered in accordance with their depth.

In order to implement the invention, an apparatus for transmitting a 3D model associated to a 3D video frame has:
- a first analyzer for splitting the 3D model into one or more components;
- a second analyzer for determining whether a component of the one or more components is hidden by other 3D content; and
- an output for transmitting those components of the 3D model that are not hidden by other 3D content, and for subsequently transmitting the remaining components of the 3D model.

Similarly, an apparatus for preparing a 3D model associated to a 3D video frame for transmission has:
- a first analyzer for splitting the 3D model into one or more components; and
- a second analyzer for determining whether a component of the one or more components is hidden by other 3D content.

Advantageously, a list generator is provided, which generates a list of components of the 3D model, in which the components of the 3D model are ordered in accordance with their depth. Preferably, the list generator 4 is adapted to generate a single list of components for all 3D models associated to the 3D video frame, in which the components of all 3D models are ordered in accordance with their depth.

According to a further aspect of the invention, a recording medium having recorded thereon 3D content, which includes at least one or more 3D video frames and one or more 3D models associated to the one or more 3D video frames, contains at least one list of components, in which components of the one or more 3D models associated to a 3D video frame are ordered in accordance with their depth.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
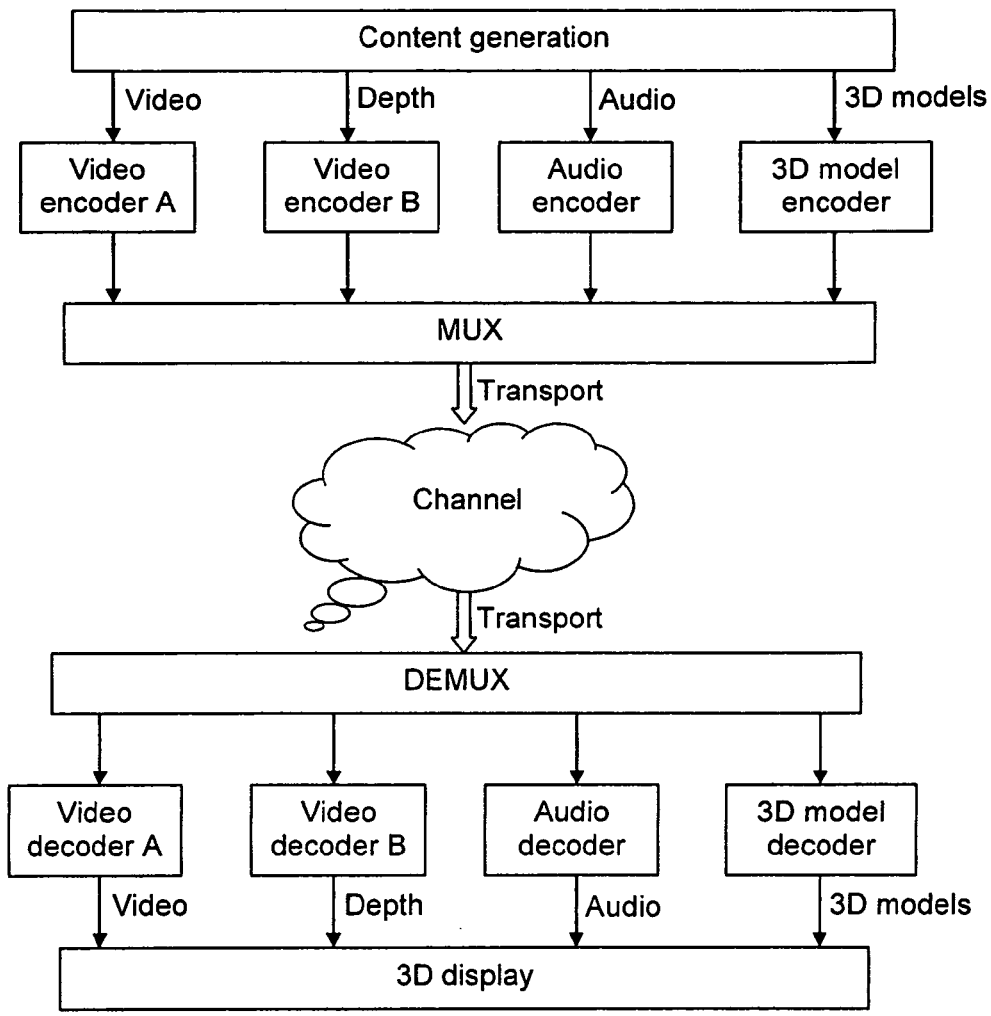
FIG. 1 shows a complete chain of stereoscopic content.

FIG. 1 shows an example complete chain of stereoscopic content, from the content generation to the display. As shown in the figure, apart from the video and audio streams, which consist of traditional 2D program, a depth stream is transmitted so that viewers can enjoy stereoscopic images. Furthermore, a 3D models stream is advantageously transmitted to enhance the interactivity and 3D effects. All these streams are synchronized.

A 3D model is a data structure that consists, for example, of a list of vertices, a list of edges, a list of wedges, a list of faces and a list of material properties. A vertex represents a point in the 3D space, which can be represented by an ordered triplet (x, y, z). The first entry of the triplet conventionally represents the horizontal position and is typically denoted by x. The second entry represents the vertical position and is typically denoted by y. Finally, the third number represents the depth and is typically denoted by z.

An edge is a line joining two vertices. A wedge is an intermediate abstraction layer between vertices and faces, which is used to encapsulate the scalar attributes, such as normal vectors and texture coordinates, of a vertex. A face is a triangular plane with exactly three wedges at its corners. Material attributes represent the discrete attributes, such as ambient, diffuse, emissive, specular and shininess, of the faces, which are used to specify the appearance of the faces during rendering.

Figure 2:
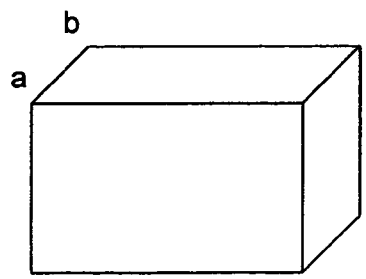
FIG. 2 depicts a cube model.
Figure 3:
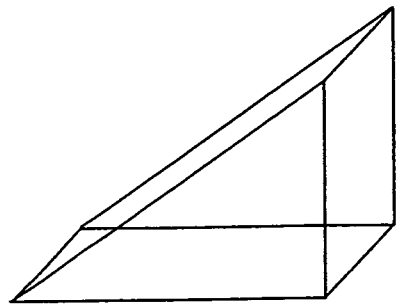
FIG. 3 shows the result of an incomplete model.

FIG. 2 shows the geometry effect of a cube model. In this 3D model, there are eight vertices. Unlike video frames, which are just rendered for an instant and then removed from the buffer, 3D models are stored in the system and may be rendered for a long time. Usually a 3D model needs to be received completely before it can be rendered by a client. However, if some vertices are lost, the 3D model can still be rendered, but the result may not what it is expected. FIG. 3 is the rendering result of the 3D model of FIG. 2 if the two vertices a and b of the top left front and rear corner of the cube model are lost.

Each 3D model as considered in the present application is assumed to comprise one or more components. A component is defined as an atomic part of a model, which is semantically meaningful and can be individually transmitted to a client for rendering purposes. For example, a small component can be comprised of a single face.

In a 3D transmission system, e.g. in a 3D TV broadcasting system, both 3D video and 3D models are transmitted. In many cases some 3D models or some components of a model will be hidden by the content of the 3D video. The present invention makes use of this circumstance by progressively transmitting the components of a model according to the depth of the components and the video. Before transmitting a 3D model, the service device orders the components of the model by their depth so that those components that are not hidden are transmitted first. For this purpose the depth of a component is defined as the depth of the farthest vertical plane perpendicular to the z-axis that is able to completely hide the component. In other words, the depth of a component is the minimum z-value of all vertices of the component, provided that the z-value increases with increasing distance of a component.

Figure 4:
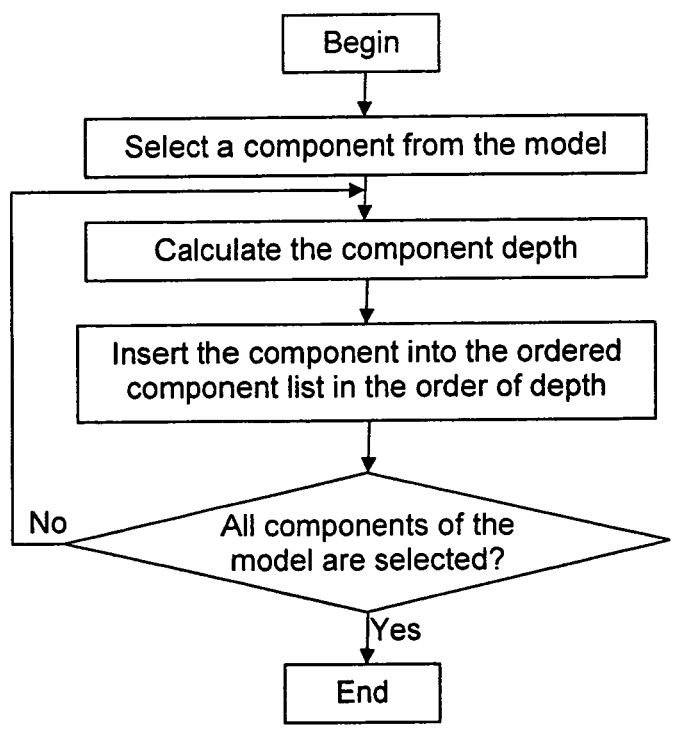
FIG. 4 illustrates a flow chart of a component ordering step.

FIG. 4 depicts a flow chart of a component ordering step for one model. After selecting a component from the model the depth of the component is calculated. The selected component is then inserted into an ordered list of components in accordance with the calculated depth. Subsequently it is checked whether all components of the model have been processed. If this is not the case, the next component is selected and processed. The procedure is repeated until all components have been processed.

Figure 5:
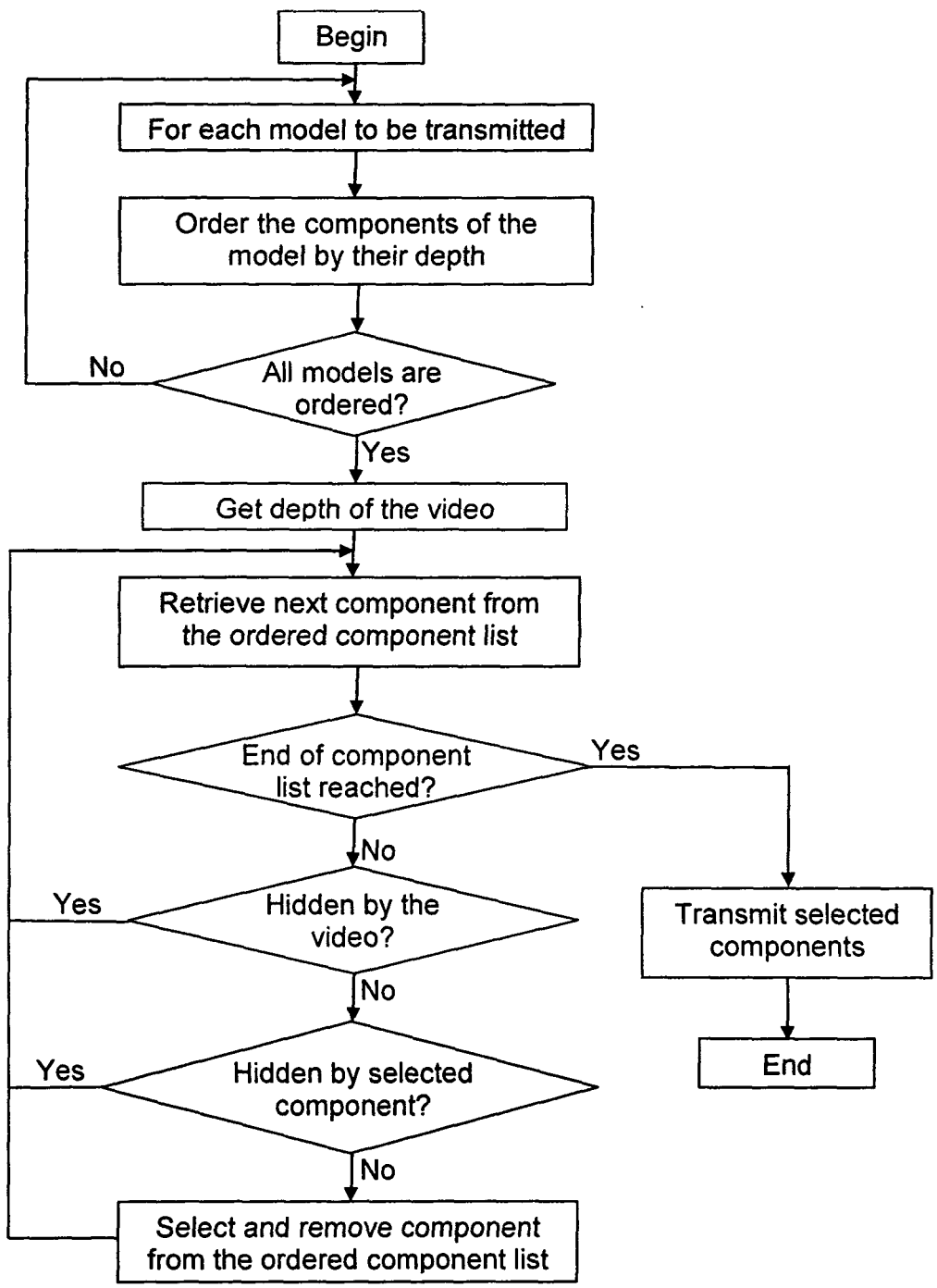
FIG. 5 depicts a flow chart of a progressive transmission of components of models according to the invention.

FIG. 5 is a flow chart showing how to progressively transmit components of models in a 3D transmission system in which both 3D video and 3D models are transmitted. The server firstly orders the components of all 3D models that are going to be transmitted in a single ordered list of components. Then the server gets the depth map of the video frame that these models are synchronized with. Next, the server runs through the ordered list of components. For each component, the server checks if the component is completely hidden by the video or by previously selected components. Only if the component is not completely hidden it is selected for transmission and removed from the ordered list of components.

Since the list of components is ordered by the depth, a component later in the list will never completely hide a component earlier in the list. As a result, all selected components are reliably not completely hidden. Only these selected components are transmitted initially.

When the server is going to transmit next video frame, it will look for all new 3D models synchronized with this new video frame. The components of these new models will be ordered and merged with the ordered list of components that were not transmitted along with previous video frame. Then the server will select components from the new ordered list of components that are not completely hidden by the video frame or other selected components. Only these selected components are transmitted with the video frame. This procedure goes on until all components of all 3D models have been transmitted.

It is possible that only a part of a 3D model has been received when the client tries to render it. However, since those components that are not transmitted are hidden by the content of 3D video or by other 3D models, viewers will not notice that the 3D model is incomplete. With continuing transmission the rest of the 3D model will be progressively transmitted to the client by the server device so that the client will finally receive a complete 3D model.

Figure 6:
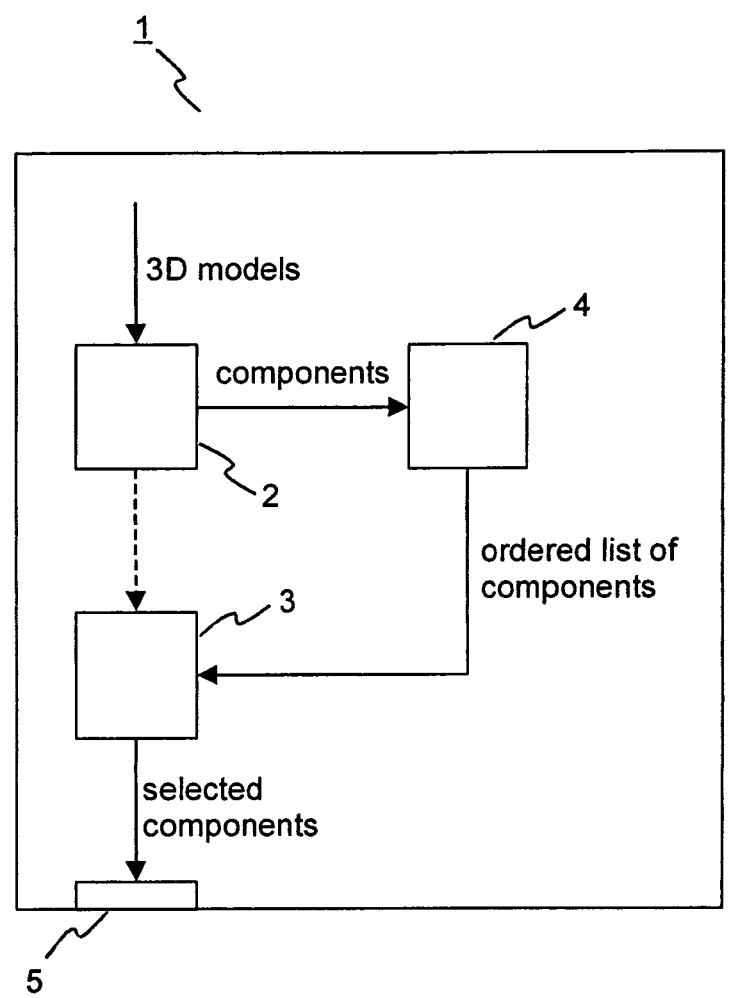
FIG. 6 schematically illustrates an apparatus adapted to implement the invention.

An apparatus 1 that is adapted to implement the present invention is schematically illustrated in FIG. 6. The apparatus 1 includes a first analyzer 2 for splitting a 3D model, which is associated to a 3D video frame, into one or more components.

A second analyzer 3 determines whether a component of the one or more components is hidden by other 3D content. For this purpose a list generator 4 generates a list of components of the 3D model, in which the components of the 3D model are ordered in accordance with their depth.

Advantageously, the list generator 4 is adapted to generate a single list of components for all 3D models associated to the 3D video frame, in which the components of all 3D models are ordered in accordance with their depth. Of course, it is likewise possible that the second analyzer 3 analyzes the components without the help of the ordered list of components, which is indicated by the dashed arrow in FIG. 6. The output of the second analyzer 3 is a list of selected components that are to be transmitted first as well as list of components that are to be transmitted subsequently. The apparatus further has an output 5 for transmitting the components of the 3D model as determined by the second analyzer 3.

What is claimed, is:

1. A method for transmitting a 3D model synchronized with at least a first video frame of a 3D video representing stereoscopic content, the 3D model being provided for rendering along with the at least first video frame of the 3D video, wherein the 3D model includes one or more components and is comprised of a set of connected points in 3D space forming a polygonal mesh structure, the method comprising:
   generating a list of components of the 3D model, in which the components of the 3D model are ordered in accordance with their depth;
   based on the list of components, determining whether a component of the 3D model is completely hidden by other 3D content, wherein the other 3D content comprises at least one of the first video frame of the 3D video, another component of the 3D model, and another 3D model, wherein a component is an atomic part of the 3D model and can be individually transmitted for rendering purposes;
   transmitting those components of the 3D model that are not completely hidden by other 3D content;
   from remaining components of the 3D model, selecting one or more components of the 3D model that are not completely hidden by a next video frame of the 3D video or another component of the 3D model or another 3D model; and
   transmitting the selected components of the 3D model.

2. The method according to claim 1, wherein a single list of components is generated for all 3D models associated with the at least first video frame of the 3D video, in which the components of all 3D models are ordered in accordance with their depth.

3. A method for preparing a 3D model synchronized with at least a first video frame of a 3D video representing stereoscopic content for transmission, the 3D model being provided for rendering along with the at least first video frame of the 3D video, wherein the 3D model includes one or more components and is comprised of a set of connected points in 3D space forming a polygonal mesh structure, the method comprising:
   generating a list of components of the 3D model, in which the components of the 3D model are ordered in accordance with their depth;
   based on the list of components, determining whether a component of the 3D model is completely hidden by other 3D content wherein the other 3D content comprises at least one of the first video frame of the 3D video, another component of the 3D model, and another 3D model, wherein a component is an atomic part of the 3D model and can be individually transmitted for rendering purposes;
   selecting those components of the 3D model that are not completely hidden by other 3D content for transmission along with the first video frame of the 3D video; and
   from remaining components of the 3D model, selecting one or more components of the 3D model that are not completely hidden by a next video frame of the 3D video or another component of the 3D model or another 3D model for transmission along with the next video frame of the 3D video.

4. The method according to claim 3, wherein a single list of components is generated for all 3D models associated with the first video frame of the 3D video, in which the components of all 3D models are ordered in accordance with their depth.

5. An apparatus for transmitting a 3D model synchronized with at least a first video frame of a 3D video representing stereoscopic content, the 3D model being provided for rendering along with the at least first video frame of the 3D video, wherein the 3D model includes one or more components and is comprised of a set of connected points in 3D space forming a polygonal mesh structure, the apparatus comprising:
   a list generator configured to generate a list of components of the 3D model, in which the components of the 3D model are ordered in accordance with their depth;
   an analyzer configured to determine, based on the list of components, whether a component of the 3D model is hidden by other 3D content, wherein the other 3D content comprises at least one of the first video frame of the 3D video, another component of the 3D model, and another 3D model, wherein a component is an atomic part of the 3D model and can be individually transmitted for rendering purposes, and to select one or more components of the 3D model that are not completely hidden by a next video frame of the 3D video or another component of the 3D model; and
   an output configured to transmit the first video frame of the 3D video and those components of the 3D model that are not completely hidden by other 3D content, and to transmit the next video frame of the 3D video and the selected components of the 3D model.

6. The apparatus according to claim 5, wherein the list generator is configured to generate a single list of components for all 3D models associated with the first video frame of the 3D video, in which the components of all 3D models are ordered in accordance with their depth.

7. An apparatus for preparing a 3D model synchronized with at least a first video frame of a 3D video representing stereoscopic content for transmission, the 3D model being provided for rendering along with the at least first video frame of the 3D video, wherein the 3D model includes one or more components and is comprised of a set of connected points in 3D space forming a polygonal mesh structure, the apparatus comprising:
 a list generator configured to generate a list of components of the 3D model, in which the components of the 3D model are ordered in accordance with their depth;
 an analyzer configured to determine, based on the list of components, whether a component of the 3D model is completely hidden by other 3D content, wherein the other 3D content comprises at least one of the first video frame of the 3D video, another component of the 3D model, and another 3D model, wherein a component is an atomic part of the 3D model and can be individually transmitted for rendering purposes, to select those components of the 3D model that are not completely hidden by other 3D content for transmission along with the first video frame of the 3D video, and to select, from remaining components of the 3D model, one or more components of the 3D model that are not completely hidden by a next video frame of the 3D video or another component of the 3D model or another 3D model for transmission along with the next video frame of the 3D video.

8. The apparatus according to claim 7, wherein the list generator is adapted to generate a single list of components for all 3D models associated with the first video frame of the 3D video, in which the components of all 3D models are ordered in accordance with their depth.

9. A non-transitory recording medium having recorded thereon 3D content, wherein the 3D content comprises at least a first video frame of a 3D video representing stereoscopic content and a 3D model synchronized with the at least first video frame of the 3D video, the 3D model being provided for rendering along with the at least first video frame of the 3D video, wherein the 3D model includes one or more components and is comprised of a set of connected points in 3D space forming a polygonal mesh structure, wherein components of the 3D model are arranged in a list of components, in which the components of the 3D model are ordered in accordance with their depth, wherein a component is an atomic part of the 3D model that can be individually transmitted for rendering purposes.

10. A method for receiving a 3D model synchronized with at least a first video frame of a 3D video representing stereoscopic content, the 3D model being provided for rendering along with the at least first video frame of the 3D video, wherein the 3D model includes one or more components and is comprised of a set of connected points in 3D space forming a polygonal mesh structure, the method comprising:
 receiving the first video frame of the 3D video and those components of the 3D model that are not completely hidden by other 3D content, wherein the other 3D content comprises at least one of the first video frame of the 3D video, another component of the 3D model, and another 3D model, wherein a component is an atomic part of the 3D model and can be individually received for rendering purposes; and
 receiving a next video frame of the 3D video and one or more components from remaining components of the 3D model that are not completely hidden by the next video frame of the 3D video or another component of the 3D model.

11. An apparatus for receiving a 3D model synchronized with at least a first video frame of a 3D video representing stereoscopic content, the 3D model being provided for rendering along with the at least first video frame of the 3D video, wherein the 3D model includes one or more components and is comprised of a set of connected points in 3D space forming a polygonal mesh structure, the apparatus comprising an input configured to receive the first video frame of the 3D video and those components of the 3D model that are not completely hidden by other 3D content, wherein the other 3D content comprises at least one of the first video frame of the 3D video, another component of the 3D model, and another 3D model, wherein a component is an atomic part of the 3D model and can be individually received for rendering purposes, and to receive a next video frame of the 3D video and one or more components from remaining components of the 3D model that are not completely hidden by the next video frame of the 3D video or another component of the 3D model.

* * * * *